July 4, 1950
C. STEAD ET AL
2,513,374
MEASURING APPARATUS FOR GAUGE DETERMINATION
OF DIMENSIONS OF BODIES WITH FLOW OF FLUID
UNDER PRESSURE FROM AN ORIFICE
Filed Jan. 7, 1948
4 Sheets-Sheet 4
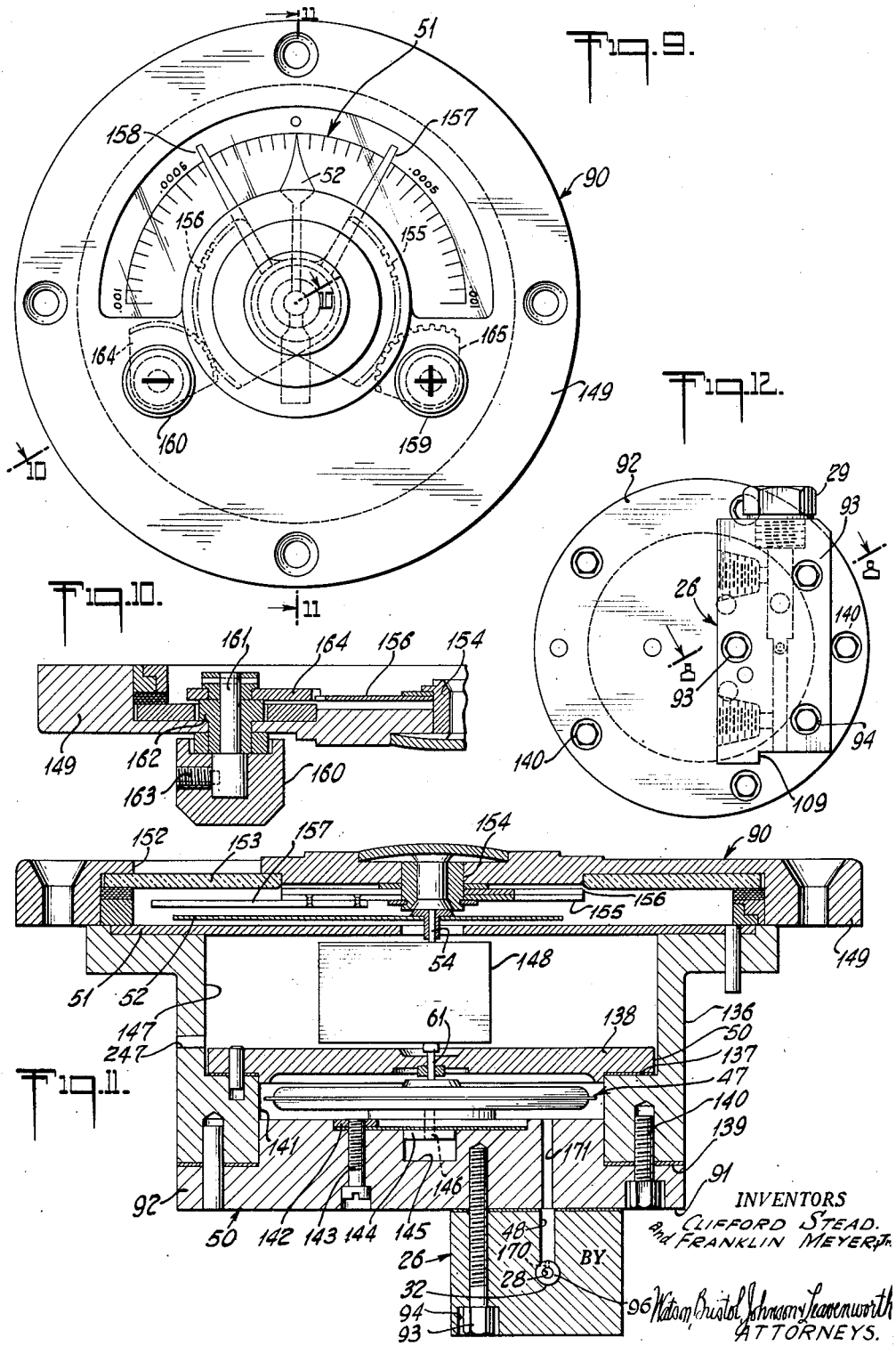
INVENTORS
CLIFFORD STEAD.
and FRANKLIN MEYER Jr.
BY
Watson, Bristol, Johnson & Leavenworth
ATTORNEYS.

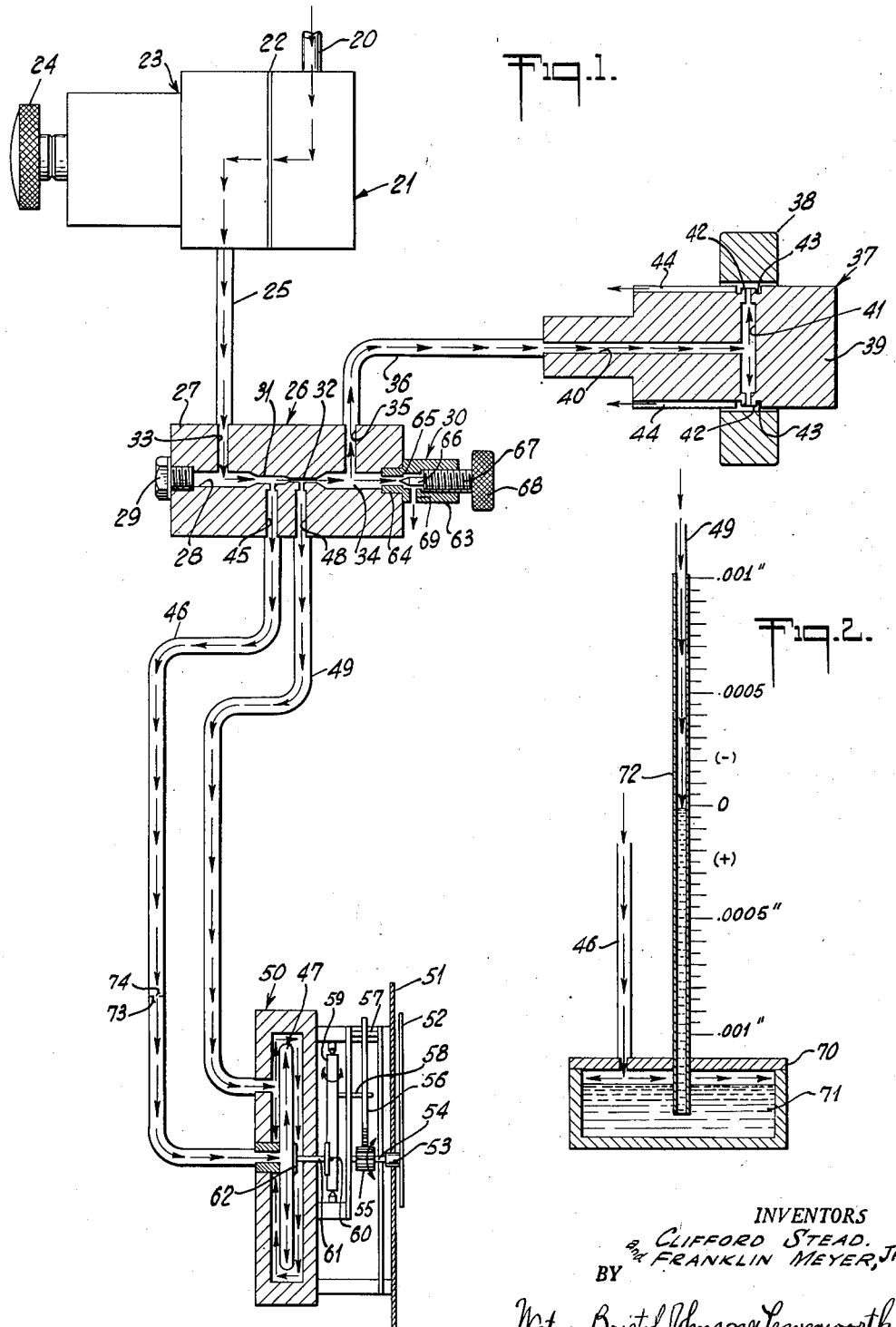

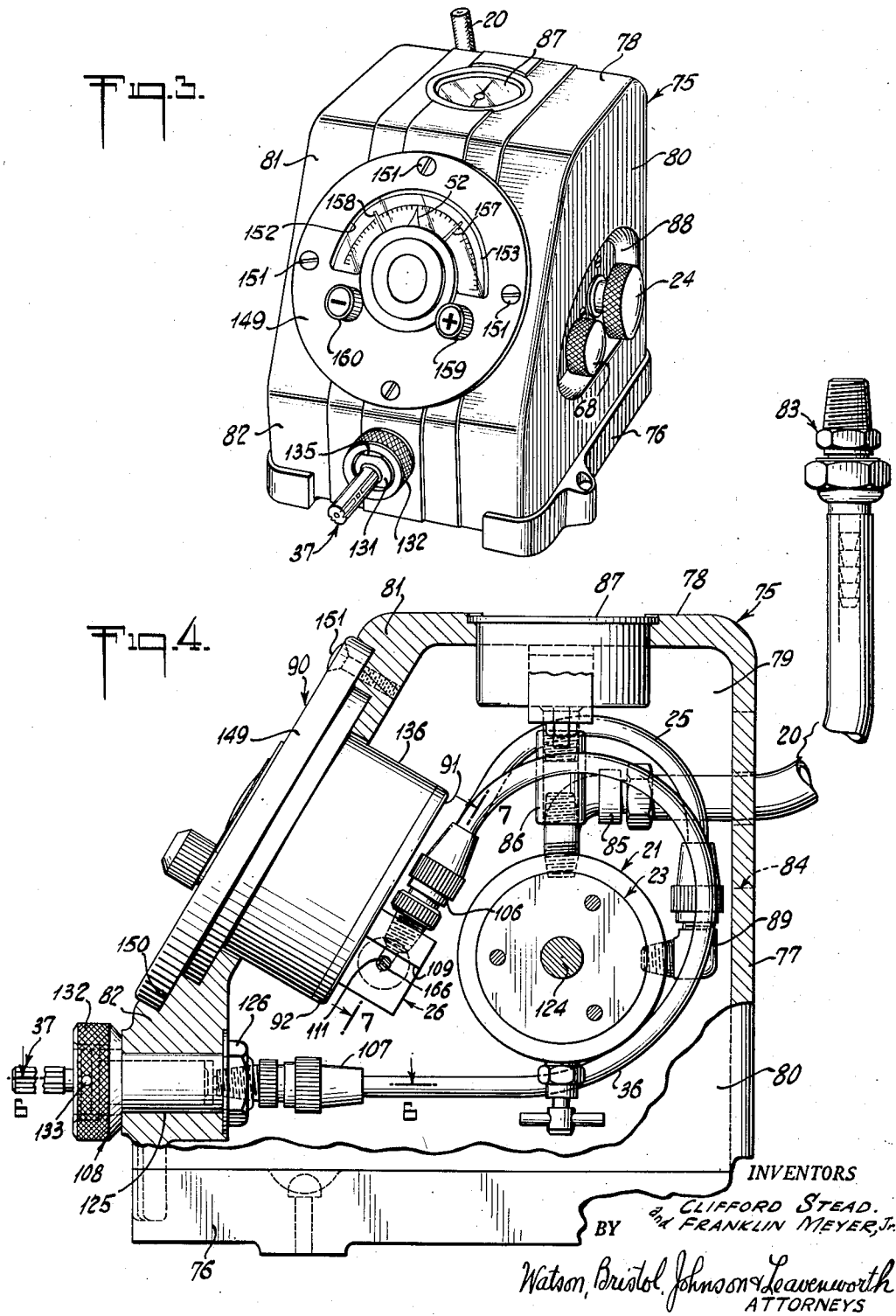

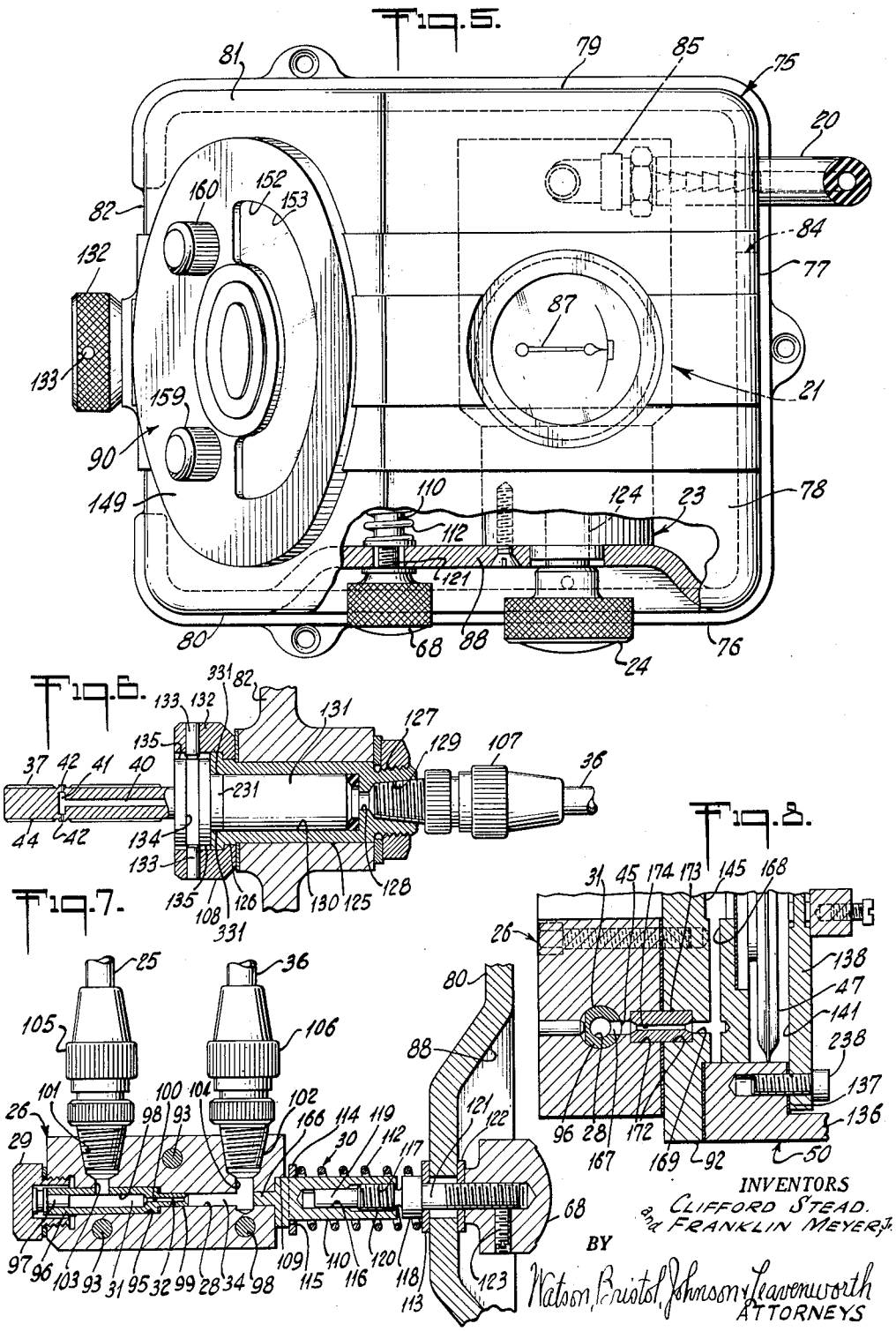

Patented July 4, 1950

2,513,374

UNITED STATES PATENT OFFICE 2,513,374

MEASURING APPARATUS FOR GAUGE DETERMINATION OF DIMENSIONS OF BODIES WITH FLOW OF FLUID UNDER PRESSURE FROM AN ORIFICE

Clifford Stead, Bellingham, Mass., and Franklin Meyer, Jr., Philadelphia, Pa., assignors to The Taft-Pierce Manufacturing Company, Woonsocket, R. I., a corporation of Rhode Island Application January 7, 1948, Serial No. 892

4 Claims. (Cl. 73—37.5)

The present invention relates to measuring apparatus for gage determination of dimensions of bodies with outlet flow of fluid under pressure from a nozzle orifice wherein the rate of outlet flow is governed by a certain dimension of the body being gaged.

A general object of the present invention is to provide measuring apparatus of the indicated type which is of simple construction but highly sensitive to velocity variation and capable of precision operation for efficient gage determination of dimensions of bodies by comparison with those of a master or standard part or parts and which, by effective magnification, permits accurate and ready determination by meter readings of very small variations in dimensions; embodiments preferably being constructed to assure ready adjustment by simple manipulation to bring the indicator of the meter to a reference or "zero" setting for use of the device with varying kinds of gaging nozzle means or members adapted respectively to the measurement of various dimensions of different body parts.

A more specific object of the present invention is the provision in such fluid gage apparatus of Venturi means which will provide differential fluid pressure for efficient operation of gage meter means with flow of fluids, such as air under pressure, to the gaging nozzle means, and so equipped as to permit by manual manipulation of a bleed valve adjustment of the rate of venting part of the fluid or air from the Venturi means to atmosphere to adjust the meter to "zero" setting for any particular comparative measurement of dimensions of certain parts of particular bodies.

Another object of the present invention is to provide such a structure in the form of a self-contained apparatus unit or instrument equipped with a supply conduit preferably of the flexible tube type, a visual dial meter, a quick-change fitting for connection to any one of a plurality of gaging nozzle means or members and at least one manual control or knob for adjustment of the bleed valve to control rate of venting for adjustment of the meter indicator to "zero" setting.

A further object of the present invention is the provision of a structural embodiment of the device and component parts thereof which are readily constructed and permits efficient use and operation thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 shows in diagrammatic form, with parts in section, a layout of an embodiment of the present invention;

Fig. 2 is an elevational view, with parts in section, of a modified form of differential pressure gage meter means of the apparatus shown in Fig. 1;

Fig. 3 is a perspective view of a preferred, self-contained instrument embodiment of gage apparatus of the present invention;

Fig. 4 is a side elevational view to a larger scale, with parts broken away and in section, of the apparatus shown in Fig. 3;

Fig. 5 is a top plan view, with parts broken away and in section, of the apparatus shown in Fig. 4;

Fig. 6 is a sectional view, to an enlarged scale, taken substantially on line 6—6 of Fig. 4;

Fig. 7 is a sectional view to the same scale of Fig. 6, taken substantially on line 7—7 of Fig. 4;

Fig. 8 is a sectional view, with parts broken away, taken substantially on line 8—8 of Fig. 12, but to a larger scale;

Fig. 9 is a front view, to an enlarged scale, of the face of the meter and associated structure exposed on the front of the apparatus shown in Figs. 3, 4 and 5;

Fig. 10 is a sectional view taken substantially on line 10—10 of Fig. 9;

Fig. 11 is a sectional view, to an enlarged scale, taken substantially on line 11—11 of Fig. 9; and Fig. 12 is a rear end view, with parts omitted, of the meter unit shown in Fig. 11, but to a reduced scale.

Referring to the drawings, like numerals identify similar parts throughout and, as will be seen from Fig. 1, the fluid gage apparatus of the present invention in its simplest form comprises a supply conduit 20, preferably of the flexible hose or tube type, to be connected to a supply of fluid under pressure, such as compressed air. Supply conduit 20 is connected to and communicates with the interior of suitable pressure regulator means 21, which may be equipped, as diagrammatically indicated at 22, with any suitable filtering material for screening out oil or moisture that may be suspended in the supplied compressed air. The air, preferably after being filtered, passes through any suitable regulator mechanism at 23 which may be of known construction (not shown) and provided with a suitable manual adjusting knob 24. Conduit means 25 feeds the compressed air, after passing through regulator mechanism 23, to a suitable Venturi conduit means or unit 26.

The Venturi conduit means 26 may comprise a body or block 27 having a through bore 28 capped off at one end by a cap screw or threaded plug 29 and closed off at the other end by bleed valve 30. The passage provided by the bore 28 is stepped or counterbored to provide a Venturi constriction at 31 and another at 32, with the latter preferably, but not necessarily, being the one of smaller diameter. When the Venturi constriction of smaller diameter is arranged on the downstream side of the larger constriction possibility of difficulties due to turbulence, etc. is avoided. The portion of the passage 28 ahead or upstream of the first Venturi constriction 31 is brought into communication with the supply conduit 25 through a bore or hole 33 to constitute an inlet for the Venturi means. Portion 34 of passage 28 between the smaller Venturi constriction 32 and the bleed valve 30 constitutes an outlet space or chamber and is connected by an outlet bore or hole 35 to duct means or a conduit 36 leading to any suitable gaging nozzle means or member 37.

As shown in Fig. 1, the gaging nozzle means or member 37 may be provided in a form suitable for rapid and repeated comparison of the internal diameters of rings, such as that shown at 38. For this purpose, the gaging nozzle means may comprise a body 39 having a longitudinally extending bore 40 communicating at one end with the duct or conduit 36 and at the other end with a cross bore 41 terminating at the sides in nozzle tips 42, 42, each having an orifice feeding to a localized surrounding depression 43. As understood in the art, a greater number of the cross bores and nozzles may be provided to assure distribution of many air jets circumferentially about the gaging head 39. The depressions 43, 43 are relieved by longitudinally-extending grooves 44 for ready passage of the discharged fluid or compressed air to atmosphere after gaging has been accomplished in the clearance between the nozzle tips 42, 42 and the inner cylindrical surface of ring 38.

The larger Venturi constriction at 31 is connected by a bore 45 and suitable duct means 46 to the interior of or a chamber within a flexible diaphragm element 47 preferably formed of spring metallic material. The smaller Venturi constriction at 32 is connected by a bore 48 and suitable duct means 49 to the interior of or a chamber within a closed casing member 50 arranged about the diaphragm element 47. Closed casing 50 and diaphragm 47 comprise parts of differential pressure gage meter means, and it is possible, if desired, to reverse the ducts 46 and 49 with respect to their connections to hollow diaphragm 47 and its casing 50, it merely being necessary to subject the diaphragm to the differential in pressure between the Venturi constrictions.

That meter means may be provided with a circular dial face 51 having indicia or scale divisions for indicating dimensions in fractions of inches or other standard units. An indicator arm or pointer 52 is pivotally mounted at 53 for sweep across the face of the dial 51. The pointer 52 may be fixed at 53 upon a pivoted shaft 54 carrying a pinion 55 meshed with a segmental gear 56 pivotally mounted at 57. Segmental gear 56 may be engaged for reciprocation by a pin 58 extending radially from and fixed upon a pivotally-mounted rocker shaft 59. The rocker shaft 59 may also carry fixed thereto another radially extending pin 60 against which bears the head of a T-pin 61 reciprocatively mounted through a hole in the casing 50 with its inner end fixed at 62 to the head of the diaphragm element 47.

It will be noted that the pointer-operating mechanism of the meter proper is mounted exteriorly of or excluded from the pressure chambers provided by hollow diaphragm 47 and closed casing 50, as contrasted with prior practice of locating and sealing such mechanism in one of the chambers. This exclusion permits provision of both of the pressure chambers in minimum volume so that the pressure spaces on both sides of the diaphragm may be made of substantially equal fluid capacity, even when a hollow diaphragm of the type indicated is employed. That equalizing of the pressure spaces has been found in practice to give unusual high speed response and attendant accuracy.

The bleed valve 30 may be of any suitable or known construction, such as a needle valve structure. Bleed valve 30 may include an internally-threaded sleeve 63 having a reduced, externally-threaded end portion 64 threaded into the outlet end of the through bore or passage 28 and provided with an internal valve seat at 65. A needle valve 66 for cooperation with the valve seat 65 has an externally-threaded portion 67 to be threaded into the internally-threaded sleeve 63 and carries a manual operating knob 68. Beyond the valve seat 65 the sleeve 63 has an outlet hole at 69 for venting air to atmosphere.

In use of the device shown in Fig. 1, operation is initiated by supplying from supply conduit 20 compressed air at a controlled pressure (regulated by the regulator knob 24 as it passes from the supply conduit 20 through regulator mechanism 23) through conduit 25 to the Venturi body or unit 26 which, together with the meter means, constitutes a metering device. The compressed air then passes on through conduit 36 to the gaging nozzle means or member 37 from the nozzle tips 42, 42 of which it is discharged to atmosphere. Dimensional readings of body parts, such as the internal diameters of a plurality of rings 38, are obtained by covering the gaging nozzle tips 42, 42 with the part to be measured, with the result that the nozzle orifices in the gaging member have the flow of air therefrom restricted to a certain extent.

Of course, it will be understood that the gaging member can be made in many known different forms, such as a plug, ring, or snap gage or a nozzle having a single outlet arranged above an anvil, etc., and such gaging member can be used for measuring internal diameters, as proposed in Fig. 1, or external diameters, width, thickness, concentricity, length, or any type of gaging that is usually obtained by some mechanical contact indicator.

Since this fluid gage apparatus is of the comparator type, it is understood that some type of master or standard part or parts is or are to be first used for setting the working range of the meter, and thereafter the parts to be gaged are compared by this apparatus with that standard or master part or parts. The system of this gaging apparatus measures change in velocity that results from the restriction of the air flow by the part being gaged. The resulting velocity of the air which passes from the nozzle means to atmosphere will be determined by the clearance between the gaging member at the nozzle orifices and the opposed surface of the part. Since the gaging nozzle orifices have definite fixed positions in the gaging member, any change of velocity indicated by the meter will represent a size change in the part with the indicia of the meter dial showing linear dimensions.

In operation of the apparatus of Fig. 1, the filtered and pressure-regulated working fluid or compressed air flows at constant pressure through the inlet bore 33 in the Venturi block 26 and thence via the inlet of passage 28 through the larger Venturi section or first constriction at 31 at increased velocity. Compressed air then flows from Venturi section or constriction 31 through the smaller Venturi section or constriction at 32 at still higher velocity to the outlet space or chamber 34 and from the latter, via conduit or duct 36, to the passages 40 and 41 and orifices of nozzle tips 42, 42 in the gaging head or member 37, where it is permitted to flow into the restricted space between the nozzle tips and the opposed surface of the part being gaged, such as the internal cylindrical surface of ring 38, and thence to the atmosphere through relief passages 44, 44.

Physical laws dictate that the total energy disregarding minor losses, must be the same at both Venturi constrictions 31 and 32 and the different velocities thereat are proportional to the cross-sectional areas of those sections. Thus, the section having the larger cross-sectional area at 31 will have the higher pressure and the lower velocity. This physical law is relied on for operation of the meter means. The higher pressure at Venturi constriction 31 is conducted by duct 46 preferably to the interior of the sensitive diaphragm 47 and the lower pressure at the smaller Venturi constriction 32 is conducted by the duct 49 preferably to the interior of the casing 50 for application to the exterior side of the diaphragm 47. Thus, the pressures on opposite sides of the diaphragm 47 will vary in proportion to the velocities of the air flow and the cross-sectional areas of the Venturi constrictions 31 and 32. When the orifices of nozzle tips 42, 42 are completely uncovered, the velocity of air flow is high and this will create a relatively high differential in pressure between the two Venturi constrictions 31 and 32, with the pressure inside the diaphragm 47 being greater than the pressure exteriorly thereof within the casing 50. As a result, diaphragm 47 will expand until the pressure in the chamber 50 applied to the exterior of the diaphragm and the recovery force of the diaphragm spring material together balance the pressure within the diaphragm. Resultant motion of the head of the diaphragm is transmitted by T-pin 61 to lever pin 60 so as to rotate pivoted or rocker shaft 59 for sweeping operation of the indicator hand or pointer 52 across dial 51 by means of lever pin 58, segmental gear 56, and pinion 55.

When a part, such as ring 38, is placed over nozzle head or member 37, the velocity of air flow therefrom is decreased by virtue of the restriction produced by the internal surfaces of the ring. As the velocity is decreased, the differential in the pressure internally and exteriorly of the diaphragm 47 is decreased, and as the pressure in casing 50 approaches the pressure in the diaphragm the latter contracts until a new balance of forces is obtained. This contraction of the diaphragm retracts the T-pin 61 to move the meter pointer 52 to a new reading on the dial for purposes of comparison, the new reading being a direct indication of a difference between the dimension of the body being gaged and a master or standard body or part initially employed for obtaining a reference reading or setting the meter of the apparatus. With provision of accurate proportions between the cross-sectional areas of the Venturi constrictions at 31 and 32, the cross-sectional areas of the nozzle orifices 42 in gaging head 37 and the total clearance between the surfaces of the gaging orifices and the opposed surface of the body being gaged, such as the cylindrical surface of the hole in ring 38, small changes in that total clearance will create corresponding changes in the pressure differential which is applied to the meter diaphragm 47 with a resulting great magnification of the size change. The apparatus highly amplifies in an efficient manner very minute differences in dimensions of parts being gaged. The velocity indication will always be the same for any particular gaging conditions and, thus, this apparatus gives excellent repeatability.

In practice it is frequently desirable to employ two master parts, one dictating the maximum acceptable size or oversize tolerance of dimension greater than a given specific and the other dictating the minimum acceptable size or undersize tolerance of dimension less than the given specific. Before gaging of a plurality of production parts meter readings can be taken with the use of both master parts to indicate on the dial the limits of the acceptable size or tolerance range. Thereafter, in gaging production parts all those which show meter readings within that defined dial range are acceptable with those giving reading outside that range being rejected. The readings obtained by such employment of master parts may be considered to be reference readings and when only one master part is employed to give only one reference reading as a given specific "zero" setting of the meter will be considered to be attained when operation or adjustment of the meter brings or shifts that reference reading into coincidence with a desired point on the dial, such as the zero indicia or mark. When two master parts are employed to define an acceptable size or tolerance range "zero" setting will be attained when operation or adjustment of the meter brings or shifts those two reference readings defining the limits of that range into coincidence with two points on the dial selected as desirable for indicating the range limits, i. e. shifts the indicated range to the desired or most convenient section or sector of the dial.

It is now seen that, for efficient use of meter readings of the apparatus and to assure that the dial pointer will be disposed or positioned in a convenient reading range, it is highly advantageous that, for any given set of conditions with the use of any particular gaging head or member for comparison determination of dimensions of any particular part of a certain type of body, there be provided simple and readily operated adjustment means for attaining zero setting of the meter pointer. The present invention makes such provision in equipping the apparatus with the manual bleed valve at 30. When the apparatus is provided with a certain type of gaging head for a particular set-up, operation may be initiated by application of the gaging head to the master or standard part or one of two such parts. The manual knob 68 may then be turned to adjust venting flow through bleed valve 30 to atmosphere via its outlet 69 until the meter pointer 52 is disposed opposite a desired point or the zero indicia on meter dial 51. If two master parts are used to define a size range both may be successively applied first to determine the dial range before manipulation of bleed valve knob 68 to dispose that range over the desired or most convenient section or sector of the dial. This venting increases the total amount of air flowing with some escape through the bleed valve to atmosphere without passing through the gaging head. Since this vented air is not metered between surfaces of the nozzle head and opposed surfaces of the part or body, it does not materially change the calibration range of the meter, but provides a means of shifting the pointer to the desired position on the dial. After such zero setting of the meter, the parts or bodies which are to be comparatively dimensioned are then successively applied to the nozzle head. Movement of the pointer in one direction from zero setting will accurately indicate in amplified manner certain oversize and movement of the pointer in the opposite direction from zero setting will accurately indicate in amplified manner certain undersize. With certain range of sizes or tolerances dictated for factory production, the operator of the apparatus can rapidly classify the parts or bodies discarding or sorting out those which, by meter readings, are indicated as being outside the permissible range of sizes or tolerance.

A modified form of meter means is indicated in Fig. 2 which may be substituted for the dial type shown in Fig. 1. It is of the manometer type, comprising a closed well 70 having a body of liquid 71 therein with the interior connected to and communicating with duct 46 leading from the larger Venturi constriction 31. A vertical graduated tube 72 has its lower end submerged in liquid 71 and is adapted for connection to duct 49 leading from the smaller Venturi constriction 32. Rise or fall of liquid in the graduated tube 72 in accordance with the differential in pressure applied to the column of liquid in the graduated tube and the body 71 thereof in the closed well 70, will accurately give the desired readings during operation of the apparatus shown in Fig. 1.

The higher pressure duct 46 leading from the larger Venturi constriction 31 to the chamber in bellows diaphragm 47 preferably is provided with a restricting means or plate 73 having a restricted orifice or throttling passage 74 therein. The throttling passage 74 will prevent full pressure being applied to the interior of the diaphragm with a surge when the gaging nozzle orifices are uncovered. The check of flow of compressed air to the diaphragm so provided will permit high velocity escape at the nozzle orifices, and thus assure a measure of protection for the diaphragm. If the connections of the ducts leading to the interior and exterior of the diaphragm 47 are reversed so that the higher pressure is applied to the exterior thereof of course the restricted orifice or throttling passage will be employed to advantage in the duct which feeds the higher pressure to the exterior, and for similar reasons.

A preferred instrument form of the apparatus, which has been constructed for commercial use, is shown in Fig. 3 et seq. That instrument comprises a casing structure 75 having a base 76, a rear wall 77, a top wall 78, side walls 79 and 80, and a front wall provided with a sloped panel 81 and a lower vertical panel 82.

The flexible supply tube 20 is suitably provided on its far end with a fitting 83 for connection to any suitable source of compressed air and extends through an opening 84 in the rear wall 77 into the interior of the casing structure for connection by means of a fitting 85 to the regulator means 21. Suitable conduit means 86 makes connection between the downstream side of regulator means 21 and a pressure gage 87 mounted in the top wall 78 of the casing structure. The pressure regulator mechanism unit 23 has a shaft 124 extending through a hole in a depressed portion or recess 88 in side wall 80 and carries exteriorly of the latter regulator control manual knob 24. A fitting 89 connects the downstream side of regulator means 21 to deliver compressed air at a regulated pressure.

The sloping panel 81 of the front wall of the casing structure has a rabbeted hole therein in which is seated a suitable differential pressure gage meter unit 90, with its face exposed to view and its rear end 91 formed by a casing-closing plate 92 extending into the interior of the instrument casing structure 75, as shown in Fig. 4. The Venturi body or block 26 is mounted upon the meter end plate 92 by any suitable means, such as by three stud bolts 93—93, each having its head suitably set into a socket 94.

As shown in Fig. 7, the Venturi block 26 of the instrument shown in Figs. 3 to 12 inclusive, preferably has its through bore 28 counterbored at 95 to receive a sleeve 96, which is closed at its larger end by a plug 97 held in position by screw plug 29 threadably mounted into the larger end of the passage 28. The internal bore 98 of sleeve 96 provides the larger Venturi constriction at 31 and has a reduced end 99 fitted in passage 28 and provided with a drill hole 100 to form the smaller Venturi constriction at 32. Beyond the reduced end portion 99 of sleeve 96 passage 28 provides the outlet space or chamber 34 closed off by the bleed valve structure 30.

The Venturi block 26 is provided with an internally-threaded tapered inlet socket 101 and an internally-threaded tapered outlet socket 102. Socket 101 communicates with the interior of sleeve 96 by means of a drill hole 103 formed in the block and through the sleeve 96. The outlet socket 102 communicates with the outlet space or chamber 34 by means of a drill hole 104 formed in the block 26. Supply duct or pipe 25 is connected between the outlet compartment of the pressure regulator means and the inlet socket 101 of the Venturi block 26 respectively by means of fittings 89 and 105. A fitting 106 connects duct or pipe 36 to outlet socket 102 in block 26 and the other end of that duct or pipe is connected by means of fitting 107 to suitable gaging nozzle anchoring means 108 mounted in lower vertical front wall panel 82 of the casing structure 75.

As shown in Figs. 4, 7 and 12, the downstream end of Venturi block 26 is cut back to provide a flat shoulder 109 against which a flat face on a valve member 110 of bleed valve 30 seats to prevent relative rotation. Valve member 110 has a valve extension 166 seated in the downstream end of through passage 28 and it is flatted off on one side at 111, as shown in Fig. 4, to provide a venting way. As shown in Fig. 7, the valve member 110 is biased to the closed position shown by means of a helical spring 112 confined between a washer 113 seated against the inner face of the recess 88 in side wall 80 and another washer 114 surrounding the valve member and seated against a shoulder 115 thereon. Valve member 110 has a socket 116 drilled therein and counterbored to provide an enlarged portion 117 which is internally threaded. An operating shaft 118 has a reduced end portion 119 slidable and rotatably seated in the socket 116, and an enlarged portion 120 externally threaded and engaged into the internally-threaded portion 117. The operating shaft 118 has an outer reduced end 121 extending through washer 113, a hole in the recess 88 of side wall 80, and another washer 122 located on the outer face of wall 80. The outer end of shaft 121 is externally threaded to receive thereon manual knob 68 having an internally threaded socket therein and, preferably, a set screw 123 is employed to prevent relative rotation therebetween.

Thus, as operating shaft 118 is rotated by control knob 68 in one direction, its externally-threaded portion 120 will be screwed into the internally-threaded portion 117 of valve member 110 to move the latter outwardly against the biasing force of helical spring 112, to separate its inner end from the end of Venturi block 26 and to provide an outlet for the venting way formed by flatting off at 111 of the valve member extension 165. Reverse rotation of control knob 68 and operating shaft 118 therewith will screw externally-threaded portion 120 out of internally-threaded portion 117, permitting the biasing spring 112 to snug the end of valve member 110 up against the end of Venturi block 26 to close off the way provided by the flatting at 111. This bleed valve structure will permit fine adjustment of the rate of flow of air vented from the outlet chamber or space 34 in the Venturi block 26.

The anchoring means 108 for the gaging nozzle connector preferably comprises, as shown in Fig. 6, a sleeve 125 seated in a hole through the panel 82 and having a circumferential flange 126 seated against the outer face of the panel. The inner end of sleeve 125 extends beyond the inner side of panel 82 and is externally threaded to receive a nut 127 to hold it in position. Sleeve 125 is provided with an internal bore 128 counterbored at one end to provide an internally-threaded tapered socket 129 to receive fitting 107 on the end of duct or pipe 36 and is counterbored from the outer end at 130 slidably to receive a connector plug 131, preferably having a circumferential shoulder 231 milled or flatted off on diametrically opposite sides at 331, 331 to fit a correspondingly shaped part of bore 130 to prevent relative rotation. A bayonet ring 132 is rotatably mounted on the outer extending end of the sleeve 126 and carries pins 133, 133 to be received in a circumferential groove 134 in plug 131 when passed thereto over flats 135, 135, with the ring 132 then rotated to the position shown in Fig. 4 from the position shown in Fig. 6. The connector plug 131 may be made integral or may carry directly on the outer end thereof the gaging nozzle means or head 37 or, if desired, the passage extending longitudinally through it may be communicatively connected to the interior of a flexible conduit anchored to the plug and extending to a remote location and there provided with the gaging nozzle head.

The differential pressure gage meter 90 may comprise a cylindrical casing member 136 provided with an internal shoulder 137 to which is gasketed a partition plate 138 anchored by stud bolts 238, and an external shoulder 139 to which is gasketed and anchored by any suitable means, such as stud bolts 140—140, to the end plate 92. Between the partition plate 138 and end plate 92 there is thus formed closed casing chamber 141 which corresponds to the chamber in casing 50 of the structure shown in Fig. 1.

The hollow diaphragm 47 is mounted in chamber 141 and carries a base structure which includes a plate 142 gasketed into a recess in the inner face of end plate 92 and held in position by stud bolt 143. The base structure has an extension 144 seated into a socket 145 in the inner face of end plate 92 and the base structure has a bore or passage 146 extending therethrough from chamber 145 into the interior of diaphragm 47.

Within the meter casing sleeve 136 is provided a mechanism housing compartment 147 between partition plate 138 and dial plate 51 supported on and carried by the outer end of that casing sleeve. Compartment 147 is in communication with the atmosphere, preferably via a hole 247, with the operating fluid or compressed air being confined to hollow diaphragm 47 and chamber 141 for the reason indicated above. In that compartment 147 is mounted any suitable operating mechanism unit 148, the specific internal structure of which is not shown other than as disclosed in principle in Fig. 1 since it constitutes no part of the invention claimed herein. Operating pin 61 connected to the head of diaphragm 47 extends through a hole in partition plate 138 to the interior of the operating mechanism unit 148 and pointer shaft 54 extends from the latter through a central hole in the dial plate 51.

An anchoring plate 149 is provided for holding the meter unit in position in the sloping front panel 81, preferably being arranged to seat in a circular rabbeted recess 150 and to be anchored by screws 151—151. The face plate 149 is provided with an arcuate slot 152, preferably closed off by transparent panel 153. The anchoring plate 149 preferably has a central stud 154 upon which are rotatably mounted a pair of segmental gears 155 and 156. Segmental gear 155 carries an indicator arm 157 to indicate one reference reading or one limit of size or tolerance range, e. g. the limit of plus tolerance for oversized parts, and segmental gear 156 carries an indicator arm 158 to indicate another reference reading or other limit of size or tolerance range, e. g. the limit of minus tolerance for undersized parts. Anchoring plate 149 rotatably carries control knob 159 for adjustment of the indicator arm 157 and control knob 160 for manual adjustment of indicator arm 158. These structures are similar, and details thereof are shown in Fig. 10, where it is indicated that control knob 160 is mounted upon a shaft 161 rotatably supported in a suitable bearing structure 162 mounted through anchoring plate 149 with the knob fixed to the shaft by set screw 163. The inner end of the shaft 161 carries fixed thereto a segmental gear 164 meshed with segmental gear 156 so that as the knob 160 is turned, meshed segmental gears 164 and 156 will adjust the position of range indicator arm 158. As indicated in Fig. 9, control knob 159 operates segmental gear 165, which is meshed with segmental gear 155 to adjust the position of indicator arm 157, in a similar manner.

As shown in Fig. 8, the Venturi block 26 is provided at 31 with bore 45 to align with a hole 167 in sleeve 96. Chamber 145, which is in communication with the interior of diaphragm 47, is connected by a cross bar 168 in end plate 92 to a bore 169 therein aligned with bore 45 in Venturi block 26. The aligned bores 45 and 169 are connected together so that the Venturi constriction of larger diameter at 31 communicates through hole 167 in sleeve 96, bore 45 in Venturi block 26, bores 169 and 168 in end plate 92, chamber 145 and duct 146 to the interior of hollow diaphragm 47. The smaller Venturi constriction provided by sleeve 96 at 32 is connected via a hole 170 in the sleeve with bore 48 in Venturi block 26 as shown in Fig. 11. A bore 171 through end plate 92 connects bore 48 with casing chamber 141 in which diaphragm 47 is mounted. The aligned bores 45 and 169 are preferably connected together by being counterbored at 172 to receive a restricting sleeve 173, having a throttling passage 174 therein for the surge checking function indicated above.

The instrument of Figs. 3 to 12 inclusive is employed in the manner indicated above in connection with the described operation of the mechanism shown in Fig. 1. For example, with the supply tube 20 connected to a suitable source of compressed air regulator manual knob 24 is adjusted so that pressure gage 87 indicates the desired air supply pressure. The proper gaging nozzle means or head 37 is mounted in fitting 108. A master or standard part may be brought into association with the gaging nozzle head 37 and the reference reading of pointer 52 noted. That master or standard part may be of dimensions corresponding to the smallest that will be tolerated. Another master or standard part of dimensions corresponding to the largest that will be tolerated may then be applied to the gaging nozzle head 37 and the reference reading of pointer 52 again noted. The two reference readings so obtained define therebetween a section or sector of dial 51 which indicates the size range for identification of acceptable production parts. If that sector is too far to one side or other of zero indicia to make conventional reading difficult or impossible, bleed valve control knob 68 is manually rotated to adjust the venting to a rate which will move the reference readings obtainable with the master parts to the desired dial sector, thus adjusting the meter to zero setting. The indicators 157 and 158 will then be moved by manipulation of knobs 159 and 160 to coincide their positions respectively with those reference readings. Similar manipulations are performed where only one master part is employed to give a reference reading intermediate given tolerance limits, the bleed valve control knob 68 being manipulated to bring the pointer 52 into coincidence with the zero indicia when the reference reading is taken, the tolerance knobs 159 and 160 then being manipulated until the indicator arms 157 and 158 are respectively set to the allowed or dictated maximum plus and minus tolerances. In either case the operator then begins successively gaging the parts by applying each to the gaging nozzle head. If pointer 52 remains within the arc or sector of dial 51 defined between indicator arms 157 and 158, the operator knows that the gaged part is acceptable. Any parts which in gaging cause pointer 52 to move outside the range of that arc or sector can be rejected or sorted out. It will thus be understood that the instrument effectively permits ready alteration and adjustment to any particular set-up employing a particular gaging nozzle means or head and that for any given set of conditions the instrument can be readily adjusted to zero setting so that the pointer will operate within a desired dial area.

It will thus be seen that the objects set forth above, among others made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Fluid gage apparatus comprising, in combination, a fluid conduit means, a source of fluid under predetermined pressure connected thereto, a Venturi means in said conduit having two sections of different cross sectional areas through which the fluid is adapted successively to advance, a gaging nozzle connected to said conduit means to check the dimensions of articles, and an indicator connected to each of said Venturi sections to respond to the differential pressures thereof in accordance with the respective fluid velocities and thereby to check the dimensions of said articles.

2. Fluid gage apparatus comprising, in combination, Venturi conduit means having a fluid inlet side, a closed outlet space and an intervening passage provided with a pair of Venturi constrictions of different diameters, means to conduct fluid from the outlet space to gaging nozzle means, differential pressure gage meter means operable by a differential in fluid pressure, means to conduct fluid pressures from said pair of Venturi constrictions to said gage meter means to apply to the latter differentials in pressure existing at the constrictions, means providing a relief passage for venting the closed outlet space to atmosphere, and an adjustable manual bleed valve in the relief passage to control rate of venting for adjustment of said meter means to desired setting.

3. A self-contained fluid gage apparatus comprising, in combination, a casing structure having its interior in communication with the atmosphere, a fluid supply conduit extending through an aperture in a wall thereof to the interior of said casing structure, a differential pressure gage meter mounted in said casing structure with a dial thereof exposed to view on the casing face and having a movable indicator and indicator-operating means including a diaphragm, a closed hollow Venturi body mounted in said casing structure and having a stepped passage therein providing a pair of Venturi constrictions with one being of greater cross-sectional dimension than the other, duct means connecting the passage constrictions to opposite sides of said diaphragm, conduit means in said casing structure connecting said supply conduit to the upstream side of said body, a fitting on the front of said casing structure for removable reception of gaging nozzle means, other conduit means in said casing structure connecting said fitting to the downstream side of said body, means providing a relief passage in said body for venting the downstream side thereof to the interior of said casing structure, a bleed valve in the relief passage to control rate of venting for adjustment of the meter indicator to zero setting, and a manual control mounted on one side of said casing structure and exposed exteriorly thereof and extending into the interior of the latter to connection with said bleed valve.

4. A self-contained fluid gage apparatus comprising, in combination, a casing structure having its interior in communication with the atmosphere, a fluid supply conduit extending through an aperture in a wall thereof to the interior of said casing structure, a differential pressure gage meter mounted in said casing structure with a dial thereof exposed to view on the casing face and having a movable indicator and indicator-operating means including a diaphragm, a Venturi block mounted in said casing structure on the rear of said meter and having a stepped passage extending therethrough capped off at one end, bleed valve structure closing off the other end of said stepped passage, the stepped passage providing a pair of Venturi constrictions with the one nearest the bleed valve structure being of lesser cross-sectional dimension, said Venturi block being provided with an inlet bore leading to the stepped passage at a point between the capped end thereof and the Venturi constriction of larger cross-sectional dimension, said Venturi block being provided with an outlet bore connected to the stepped passage between the bleed valve structure and the Venturi constriction of smaller cross-sectional dimension, said meter and Venturi block being provided with suitable bores to form passages connecting the Venturi constrictions to opposite sides of the meter diaphragm, conduit means in said casing structure connecting said supply conduit to the inlet bore in said Venturi block, a fitting on the front of said casing structure for removable reception of gaging nozzle means, other conduit means in said casing structure connecting to said fitting the outlet bore or said Venturi block, and a manual control mounted on one side of said casing structure and exposed exteriorly thereof and extending into the interior of the latter to connection with the bleed valve closing off the downstream end of the stepped passage extending through the Venturi block, said bleed valve being adapted to provide for controlled rate of venting of fluid from the system downstream of the Venturi constrictions and upstream of gaging nozzle means for adjustment of the meter indicator to zero setting.

CLIFFORD STEAD.
FRANKLIN MEYER, Jr.

REFERENCES CITED

The following references are of record in the file of this patent:

UNITED STATES PATENTS

| Number | Name | Date |
|---|---|---|
| 1,641,295 | Schroeder | Sept. 6, 1927 |
| 1,870,058 | Levine | Aug. 2, 1932 |
| 1,940,921 | Smith | Dec. 26, 1933 |
| 1,971,271 | Mennesson | Aug. 21, 1934 |
| 2,177,244 | Ciamberlini | Oct. 24, 1939 |
| 2,185,971 | Achtel et al. | Jan. 2, 1940 |
| 2,360,705 | Moore | Oct. 17, 1944 |
| 2,446,632 | Cahill et al. | Aug. 10, 1948 |
| 2,457,401 | Rupley | Dec. 28, 1948 |

OTHER REFERENCES

Publication "New-Matic Measuring Machines," Merz Engineering Co., Indianapolis, Ind., May 1947, page 5.